United States Patent [19]

Bauver, II

[11] 4,386,738
[45] Jun. 7, 1983

[54] SONIC ATOMIZING SPRAY NOZZLE
[75] Inventor: Wesley P. Bauver, II, Windsor, Conn.
[73] Assignee: Combustion Engineering, Inc., Windsor, Conn.
[21] Appl. No.: 308,003
[22] Filed: Oct. 2, 1981
[51] Int. Cl.³ .............................................. B05B 3/14
[52] U.S. Cl. .................... 239/102; 239/424; 239/426; 239/499; 261/DIG. 48
[58] Field of Search ............... 239/102, 424, 426, 434, 239/499; 261/81, DIG. 48

[56] References Cited
U.S. PATENT DOCUMENTS

| | | | |
|---|---|---|---|
| 1,799,551 | 4/1931 | Forney | 239/424 |
| 3,297,255 | 1/1967 | Fortman | 239/102 |
| 3,638,859 | 2/1972 | MacFarlane | 239/102 |
| 3,825,188 | 7/1974 | Doering | 239/499 |

FOREIGN PATENT DOCUMENTS

| | | | |
|---|---|---|---|
| 262881 | 7/1963 | Australia | 239/424 |
| 1551648 | 3/1979 | Fed. Rep. of Germany | 239/102 |
| 640761 | 1/1979 | U.S.S.R. | 239/102 |

Primary Examiner—Johnny D. Cherry
Assistant Examiner—Michael J. Forman
Attorney, Agent, or Firm—William W. Habelt

[57] ABSTRACT

A sonic atomizing spray nozzle (40) wherein a slurry (30) of finely-divided sulfur oxide absorbent particles in a carrier liquid is sprayed into a flue gas stream (12) entering a drying chamber (20) through a continuous circumferential slit (70) as a radially outwardly directed thin continuous sheet (28). The thickness of the sheet can be varied to optimize atomization over a range of slurry flow rates by varying the width of slit (70).

4 Claims, 2 Drawing Figures

SONIC ATOMIZING SPRAY NOZZLE

BACKGROUND OF THE INVENTION

The present invention relates in general to spray dryers, and more particularly, to a spray nozzle for atomizing and spraying a slurry of finely divided material into a spray drying chamber to be contacted with a hot drying gas therein.

Spray drying is well-known in the prior art and has been used for drying solutions or slurries of finely divided particulate material dissolved or suspended in a volatile carrier liquid, most commonly water. The slurry or solution to be processed is atomized and sprayed into a hot gas stream passing through the spray dryer. The volatile carrier liquid is evaporated, and the dissolved or suspended particulate material dried to a fine powder. Spray drying has for many years been used for drying and processing food products, pharmaceuticals, and many other powder products.

More recently, spray drying has been found to be an effective method for treating flue gases from fossil fuel-fired furnaces to remove gaseous pollutants, most commonly sulfur dioxide, therefrom. In such an application, a solution or slurry of sulfur oxide absorbent, such as lime, limestone, soda ash, or caustic soda, in water is atomized and sprayed into the spray drying chamber to contact hot flue gas from the furnace. As the water in the slurry or solution is evaporated by heat from the hot flue gas, the sulfur oxide absorbent reactant contained therein reacts with sulfur dioxides contained in the flue gas. The resultant product is a dry powder of sulfur-containing salt.

A typical spray dryer generally comprises a housing defining a spray drying chamber designed to provide the proper environment and residence time for efficient drying of the solution or slurry. The drying gas is typically introduced to the vessel through an inlet at the top thereof and an outlet near the bottom thereof. The solution or slurry of particulate material to be dried is sprayed into the vessel in a finely divided form through atomization means. The atomized solution or slurry is sprayed into the hot drying gas as it enters the spray drying chamber so as to intermix with the hot gas so that the volatile carrier liquid is evaporated and the dissolved or suspended particulate material reduced to a fine, dry powder.

One type of atomization means being used in spray drying applications is a sonic atomizing spray nozzle. In such a device, sound waves are generated by impinging a high-velocity stream of a gas, most commonly air traveling at substantially sonic speed, against a tuned cavity, termed a resonator cup, disposed at the outlet of the spray nozzle. Simultaneously, the liquid solution or slurry to be atomized is injected through a plurality of small orifices into the zones of sound waves generated by discharging the high-velocity gas into the resonator cup. The vibrations from the resonating sound waves possess considerable energy and as a result, atomize the liquid into very fine droplets.

One problem encountered in using such sonic spray nozzles to spray slurries into spray dryers, such as slurries of sulfur oxide absorbent particles in a carrier liquid such as water, is the tendency of the orifices through which the slurry is sprayed to become plugged by particles in the slurry. Another problem encountered is the uneven distribution of slurry spray in the spray dryer resulting from the fact that injecting the slurry through a plurality of orifices yields a series of discrete spray streams, one emanating from each orifice, rather than a continuous spray sheet.

SUMMARY OF THE INVENTION

It is, therefore, an object of the present invention to provide a sonic atomizing spray nozzle wherein the liquid slurry or solution is sprayed into the spray dryer as a circumferentially continuous sheet.

It is also an object of the present invention to provide a sonic atomizing spray nozzle wherein plugging is eliminated, or at least minimized.

Toward the fulfillment of these and other objects, the sonic atomizing spray nozzle of the present invention comprises a support body, inner and outer open-ended annular shells coaxially extending therefrom, a resonator cup spaced from the outer annular shell and disposed coaxially therewith with its mouth facing the open end of the outer shell, and a stem extending coaxially through the inner annular shell between the resonator cup and the support body for supporting the resonator cup therefrom. A first annular passage is defined between the inner and outer annular shells and a second annular passage is defined between the inner annular shell and the stem extending coaxially therethrough. The first annular passage serves as an atomizing-gas flowpath, while the second annular passage serves as a liquid flowpath.

In accordance with the present invention, a circumferential lip extends radially outwardly from the stem at a point adjacent but spaced from the open end of the inner annular shell, thereby defining a continuous circumferential slit between the lip of the stem and the end of the inner annular shell. The slit provides flow communication between the second annular passage and space between the end of the outer annular shell and the resonator cup so that the liquid traversing the second annular passage may be sprayed into the zone of vibrating sound waves generated by the atomizing gas discharging from the first annular passage as it strikes the resonator cup.

As the liquid solution or slurry passes from the second annular passage through the circumferential slit, the direction of flow is changed from axially to radially outward and a continuous thin sheet of liquid is sprayed into the atomizing gas discharging from the first annular passage. By changing the width of the slit between the stem lip and the end of the inner annular shell, the thickness of the continuous sheet can be altered to account for variations in liquid solution or slurry feed rate to the spray dryer.

DETAILED DESCRIPTION OF A PREFERRED EMBODIMENT

Figure 1:
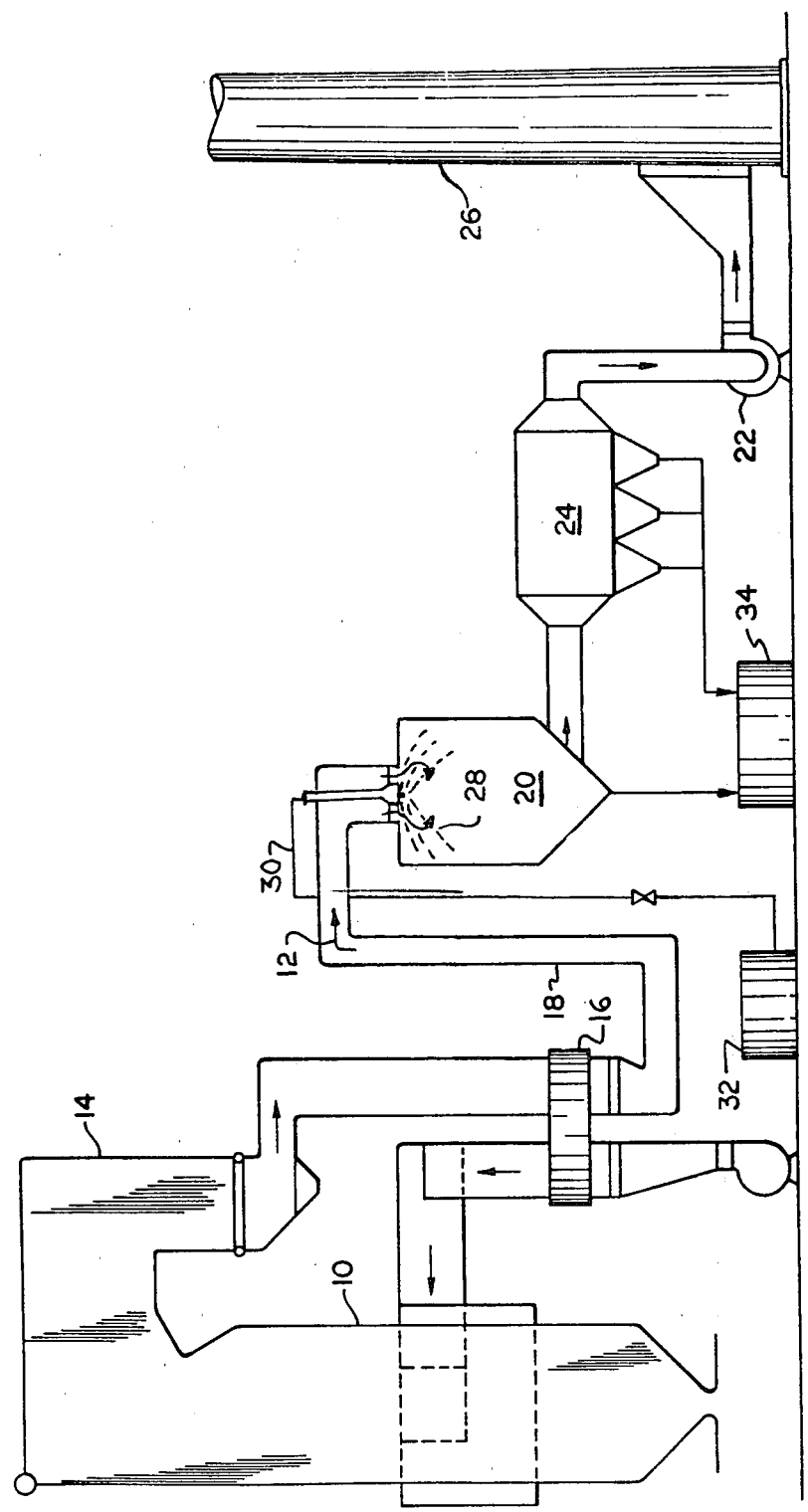
FIG. 1 is a schematic flow diagram illustrating a spray dryer apparatus embodying the spray nozzle of the present invention, the spray drying apparatus being employed as an absorption chamber for removing sulfur oxides from hot flue gases as a dry sulfur-bearing salt.
Figure 2:
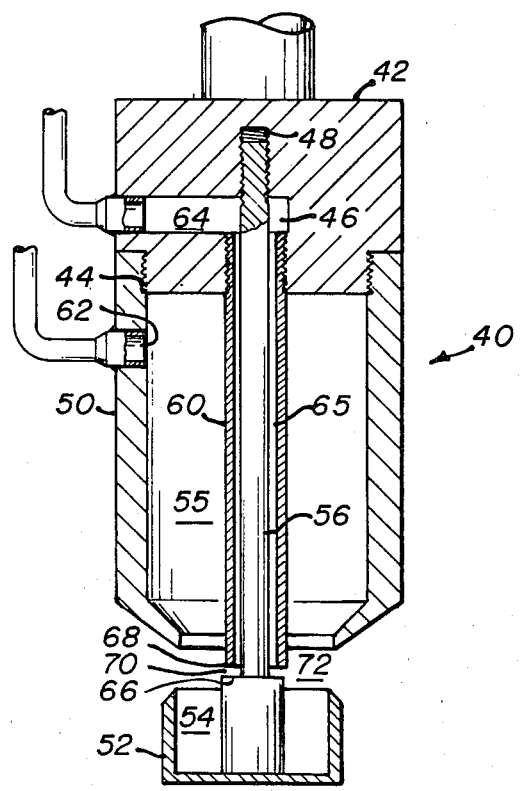
FIG. 2 is a side elevational, cross-sectional view of the spray nozzle of the present invention.

While the specification concludes with claims particularly pointing out and distinctly claiming a spray nozzle which may be utilized in any spray dryer apparatus where a slurry or solution is to be contacted with a hot drying gas in order to dry the liquid carrier and reduce the dissolver slurried solids to a fine dry powder, it is believed that the invention can be best described and better understood from the following description of a preferred embodiment of the present invention in conjunction with a spray dryer apparatus being utilized as an absorption chamber employed in removing sulfur oxides from hot flue gases generated in a fossil fuel-fired furnace. It is to be understood, however, that the spray nozzle of the present invention can also be used in many other spray drying applications well-known in the prior art. Referring now to the drawing and to FIG. 1 in particular, therein is depicted a schematic flow diagram illustrating a spray drying apparatus employed as an absorption chamber for removing sulfur oxides from hot flue gas generated in a fossil fuel-fired furnace. A sulfur-bearing fossil fuel, such as oil or coal, is combusted with air in furnace 10 to form combustion products termed flue gas 12. The flue gas, including sulfur oxide gases generated during the combustion of the sulfur-bearing fuel within the furnace 10, exits from the furnace through convection bank 14. The hot flue gas traversing convection bank 14 passes over various heat exchange surfaces immersed therein in heat exchange relationship with a liquid such as water flowing through the heat exchange surface to generate steam. The flue gas leaving convection bank 14 is then typically passed through an air heater 16 to preheat the combustion air being supplied to the furnace 10. As the flue gas passes through air heater 16, being in indirect heat exchange relationship with the combustion air being conveyed to the furnace, the flue gas is cooled to a temperature typically in the range of 100 to 200 C.

From the air heater, the flue gas 12 passes through duct 18 to one or more spray dryer absorption chambers 20. Having traversed the spray dryer absorption chambers 20, the flue gas is drawn by induced draft fan 22 through a dry particulate collector 24 and thence to a stack 26 for venting to the atmosphere.

As the hot flue gas 12 passes through the spray dryer absorption chamber 20, it contacts an atomized spray 28 of sulfur oxide absorbent slurry 30 supplied from slurry prep tank 32. The slurry 30 is prepared in slurry prep tank 32 by mixing a sulfur oxide absorbent such as lime, calcium hydroxide, soda ash, or caustic soda with a volatile carrier liquid, most commonly water. The sulfur oxide absorbent within the slurry reacts with the sulfur oxides contained in the flue gas as it passes through spray dryer 20 forming sulfur-containing salts. At the same time, the water in the slurry is evaporated by the sensible heat content of the hot flue gas whereby the sulfur-containing salts are reduced to a fine powder so that only dry particulates remain within the flue gas. While much of the dry particulate precipitates from the flue gas in the hopper of the spray dryer 20, the remainder of the dry particulate is removed from the flue gas as it passes through the dry particulate collector 24 disposed downstream of the spray dryer 20. The dry sulfur-containing particulate from the spray dryer 20 in the dry particulate collector 24 is passed to collection tank 34 for subsequent disposal.

In order to obtain optimal sulfur oxide absorption efficiencies and to completely dry the resultant salts to a fine powder, it is extremely important that the reactant slurry be brought into intimate contact with the hot drying gas as a finely atomized, mist-like spray. In accordance with applicant's invention, there is provided a spray nozzle specifically designed to provide intimate contact between the hot gas and a continuous circumferential thin sheet of slurry sprayed radially outwardly through the atomizing gas into hot flue gas as it enters the drying chamber.

Referring now to FIG. 2, there is depicted a spray nozzle 40 having a substantially cylindrical support body 42, the lower portion of which is threaded along its outer surface 44 and bored and counterbored centrally to form concentric axial cavities 46 and 48, both of which are internally threaded. An open-ended outer annular shell 50 is threaded onto the outer surface 44 of the support body 42 and extends downwardly therefrom. An open-ended inner annular shell 60 is disposed coaxially within the outer annular shell 50 and threaded into cavity 46 of the support body 42. The inner annular shell 60 extends downwardly from the support body 42 along the axis of the outer annular shell 50 for a distance at least equal to, and preferably slightly greater than, the distance that the outer annular shell 50 extends downwardly from the support body 42.

A resonator cup 52 is disposed substantially coaxially with the outer annular shell 50 spaced from and opposite the open end of the outer annular shell 50. The resonator cup 52 defines an annular resonator cavity 54 having an open end facing the open end of the outer annular shell 50. A stem 56 extends coaxially through the inner annular shell 60 between the resonator cup 52 and the support body 42 for supporting the resonator cup 52 therefrom. The upper end of stem 56 is threaded into the axial cavity 48 centrally bored in the support body 42.

A first annular passage 55 is defined between the outer annular shell 50 and the inner annular shell 60 and serves as a flow passage for directing atomizing gas into the resonator cavity 54 to generate the shock waves necessary to promote atomization of the liquid in the slurry or solution. Atomizing gas-feeding means communicate with the first annular passage 55, preferably through a passage 62 extending through the wall of the outer annular shell 50 to open into the first annular passage 55.

A second annular passage 65 is defined between the inner annular shell 60 and the stem 56 extending coaxially therethrough. The second annular passage 65 serves as a flow passage through which the liquid slurry to be atomized is passed. Liquid-feeding means communicate with the second annular passage 65, preferably through a passage 64 extending through the support body 42 to open into the second annular passage 65.

In accordance with the present invention, a circumferential lip 66 extends radially outwardly from the stem 56 at a point adjacent but spaced from the open end 68 of the inner annular shell 60, thereby defining a continuous circumferential slit 70 about the stem 56 between the lip 66 and the end 68 of the inner annular shell 60. The slit 70 provides a path for flow communication between the second annular passage 65 and the atomizing zone 72 formed between the resonator cup 52 and the end of the outer annular shell 50 by the vibrating sound waves generated in the resonator cavity 54.

In operation, passage 62 is connected to an atomizing gas supply, such as compressed air, and atomizing gas is fed through the first annular passage 55 and directed into the resonator cavity 54 of the resonator cup 52. The atomizing gas passing into the resonator cavity 54 generates a periodic series of sound waves in atomizing zone 72 in known fashion. Simultaneously, slurry from supply tank 32 is introduced in the second annular passage 65 and passes therefrom through the continuous circumferential slit 70 about the stem 56 into the atomizing zone 72.

As the liquid slurry passes from the second annular passage 65 into the slit 70, the direction of flow changes from axially to radially outward. Thus, the slurry is directed radially outward through gap 70 into the atomizing zone 72 along the entire circumference about the stem 56 as a thin continuous sheet rather than a series of discrete slurry streams as in the prior art. In this manner, a much more even distribution of liquid slurry spray is attained in the drying chamber and more thorough mixing with the hot flue gas ensured.

Further in accordance with the present invention, the width of the circumferential slit 70 may be increased or decreased in order to optimize atomization over a range of flow rates by selectively screwing the stem 56 into the threaded cavity 48 in support body 42. By advancing the stem 56 deeper into the cavity 48, the width of slit 70 is decreased resulting in a thinner sheet of slurry spray. Conversely, by backing the stem 56 out, the width of slit 70 is increased resulting in a thicker sheet of slurry spray.

From the above, it can be seen that a spray nozzle has been provided for injecting a slurry or solution into a spray dryer wherein even distribution of the atomized liquid is ensured by injecting the slurry or solution radially outward through a continuous circumferential slit of a thin continuous sheet. Further, because a continuous slit is utilized as the injection means rather than a series of discrete orifices, plugging of the spray nozzle by slurry particles is eliminated.

While a preferred embodiment of the present invention has been shown and described for purposes of illustration and complying with the best mode requirements of 35 USC 112, it is evident that certain aspects of the invention are not limited to the particular details illustrated in the drawing and discussed in the specification. Therefore, the invention described herein is not to be construed as limited to the specific embodiment of a spray dryer apparatus for sulfur oxide removal as described herein, but is intended to encompass all variations and applications that do not depart from the spirit and scope of the invention as described in the appended claims.

I claim:

1. A spray nozzle comprising:

a. a body;

b. an open-ended outer annular shell extending from said body;

c. an open-ended inner annular shell extending from said body and coaxially disposed within said outer annular shell so as to define a first annular passage between said inner and outer shells, said inner annular shell extending from said body for a distance at least equal to the distance said outer annular shell extends therefrom;

d. a resonator cup spaced from the open end of said outer annular shell and disposed substantially coaxially therewith defining a resonator cavity which opens facing the open end of said outer annular shell;

e. a stem extending coaxially through said inner annular shell between said resonator cup and said body so as to define a second annular passage between said inner shell and said stem, said stem having a circumferential lip at a point adjacent but spaced from the open end of said inner annular shell, the lip extending radially outward from said stem to form a circumferential slit between the lip and the end of said inner annular shell, the slit communicating between said second annular passage and the space between said resonator cup and said outer annular shell;

f. atomizing gas-feeding means communicating with said first annular passage; and g. liquid-feeding means communicating with said second annular passage.

2. A spray nozzle as recited in claim 1 wherein said stem is connected to said body by screw threads so as to permit the width of the slit between the lip of said stem and the end of said inner annular shell to be altered by selectively screwing said stem into said body.

3. A spray nozzle as recited in claim 1 wherein said liquid-feeding means includes a passage extending through said body to open into said second annular passage.

4. A spray nozzle as recited in claim 1 wherein said atomizing gas-feeding means includes a passage extending through the wall of said outer annular shell to open into said first annular passage.

* * * * *